(12) United States Patent
Natarajan et al.

(10) Patent No.: US 11,695,771 B2
(45) Date of Patent: *Jul. 4, 2023

(54) SYSTEMS AND METHODS FOR PROVIDING SECURITY VIA INTERACTIVE MEDIA

(71) Applicant: GanaLila, LLC, Pleasanton, CA (US)

(72) Inventors: Shreedhar Natarajan, Dublin, CA (US); Jaisree Moorthy, Dublin, CA (US)

(73) Assignee: GanaLila, LLC, Pleasanton, CA (US)

( * ) Notice: Subject to any disclaimer, the term of this patent is extended or adjusted under 35 U.S.C. 154(b) by 33 days.

This patent is subject to a terminal disclaimer.

(21) Appl. No.: 17/103,387

(22) Filed: Nov. 24, 2020

(65) Prior Publication Data

US 2021/0084041 A1    Mar. 18, 2021

Related U.S. Application Data

(63) Continuation of application No. 16/128,751, filed on Sep. 12, 2018, now Pat. No. 10,893,047, which is a
(Continued)

(51) Int. Cl.
*H04L 29/06* (2006.01)
*H04L 9/40* (2022.01)
(Continued)

(52) U.S. Cl.
CPC ............ *H04L 63/10* (2013.01); *A63F 13/537* (2014.09); *G06F 3/0484* (2013.01); *G06F 21/31* (2013.01);
(Continued)

(58) Field of Classification Search
CPC ...... H04L 63/10; H04L 63/126; A63F 13/537; G06F 3/0484; G06F 21/31; G06F 2221/2133; G06F 21/00
See application file for complete search history.

(56) References Cited

U.S. PATENT DOCUMENTS 7,155,157 B2    12/2006   Kaplan
7,395,027 B2    7/2008   Seitz et al.
(Continued)

FOREIGN PATENT DOCUMENTS

JP    2004532699 A    10/2004
JP    2010512861 A    4/2010
(Continued)

OTHER PUBLICATIONS

Agreev et al., "Find it if you can: a game for modeling different types of web search success using interaction data", SIGIR '11: Proceedings of the 34th international ACM SIGIR conference on Research and development in Information Retrieval, July (Year: 2011).*

(Continued)

*Primary Examiner* — Morshed Mehedi
(74) *Attorney, Agent, or Firm* — DLA Piper LLP (US)

(57) ABSTRACT

Methods and systems for providing security and verifying a human user and/or an authorized user are described. A system may include a processor and a non-transitory, processor-readable storage medium. The non-transitory, processor-readable storage medium may include one or more programming instructions that, when executed, cause the processor to receive a request to access a secured resource, provide a verification challenge to a user via a user interface, receive at least one input from the user in response to the verification challenge, and determine that the at least one input corresponds to at least one parameter indicative of a human user. The verification challenge may include a game.

72 Claims, 12 Drawing Sheets

Related U.S. Application Data continuation of application No. 14/775,378, filed as application No. PCT/US2014/023122 on Mar. 11, 2014, now Pat. No. 10,097,550.

(60) Provisional application No. 61/778,132, filed on Mar. 12, 2013.

(51) Int. Cl.
*G06F 21/31* (2013.01)
*A63F 13/537* (2014.01)
*G06F 3/0484* (2022.01)

(52) U.S. Cl.
CPC .... H04L 63/126 (2013.01); *G06F 2221/2133* (2013.01)

(56) References Cited

U.S. PATENT DOCUMENTS

| | | |
|---|---|---|
| 2008/0009345 A1 | 1/2008 | Bailey et al. |
| 2008/0233550 A1 | 9/2008 | Solomon |
| 2009/0210937 A1 | 8/2009 | Kraft et al. |
| 2009/0319271 A1 | 12/2009 | Gross |
| 2010/0037319 A1 | 2/2010 | Steeves et al. |
| 2010/0233667 A1 | 9/2010 | Wilson et al. |
| 2010/0325706 A1 | 12/2010 | Hachey |
| 2011/0277030 A1 | 11/2011 | Gillespie et al. |
| 2012/0167204 A1 | 6/2012 | Akka |
| 2012/0192252 A1* | 7/2012 | Kuo .................. H04L 65/1069 726/4 |
| 2012/0249298 A1* | 10/2012 | Sovio .................... G07C 9/37 340/5.82 |
| 2012/0265631 A1 | 10/2012 | Cronic et al. |
| 2012/0297190 A1 | 11/2012 | Shen et al. |
| 2012/0323700 A1* | 12/2012 | Aleksandrovich ...... G06F 21/36 705/14.69 |
| 2013/0019286 A1 | 1/2013 | Barborak et al. |
| 2013/0047231 A1 | 2/2013 | Xiao et al. |
| 2013/0079128 A1 | 3/2013 | Thomas et al. |
| 2013/0097697 A1 | 4/2013 | Zhu et al. |
| 2013/0145441 A1* | 6/2013 | Mujumdar ............ G06F 21/305 726/5 |
| 2013/0160095 A1 | 6/2013 | Seleznyov |
| 2013/0171594 A1 | 7/2013 | Gorman et al. |
| 2013/0203033 A1 | 8/2013 | Cheng et al. |
| 2014/0317744 A1* | 10/2014 | Turgeman ........... H04W 12/122 726/23 |
| 2019/0344162 A1 | 11/2019 | Moorthy et al. |

FOREIGN PATENT DOCUMENTS

| | | |
|---|---|---|
| JP | 2010517169 A | 5/2010 |
| JP | 2010233917 A | 10/2010 |
| JP | 2010277182 A | 12/2010 |
| JP | 2011514588 A | 5/2011 |
| JP | 2014524620 A | 9/2014 |
| JP | 2019055209 A | 4/2019 |
| WO | 2002101627 A1 | 12/2002 |
| WO | 2008077176 A1 | 7/2008 |
| WO | 2013025995 A1 | 2/2013 |
| WO | 2014022668 A1 | 2/2014 |
| WO | 2014164653 A1 | 10/2014 |

OTHER PUBLICATIONS

International Search Report and Written Opinion dated Dec. 13, 2013 for corresponding PCT Application No. PCT/US2013/053230.
International Search Report and Written Opinion dated Jul. 30, 2014 for corresponding PCT Application No. PCT/US2014/023122.
Are You a Human. How PlayThru Stops the Bots: Demo Video, YouTube Dec. 6, 2012, Retrieved on [Jul. 8, 2014] Retrieved from the Internet: URL <http://www.youtube.com/watch?v+z35Q3TtJ-h4 >.
Khatib et al., "Crystal structure of a monomeric retroviral protease solved by protein folding game players", Oct. 2011, Nature Structural & Molecular Biology, p. 1175-1178.
Chrons et al., (2011) Digitalkoot: Making Old Archives Accessible Using Crowdsourcing, Human Computation: Papers from the 2011 AAAI Workshop (WS-11-11), pp. 20-25.
Cooper et al., (Aug. 5, 2010) Predicting Protein Structures with a Multiplayer Online Game, Nature 466(5):756-760 (w/TOC, Suppl. Info pp. 1-45).
Moskovitch (Jun. 21, 2011) Gamification Time: What if Everything Were Just a Game?, BBC News, Business.
Shi et al., "SenGuard: Passive user identification on smartphones using multiple sensor", 2011 IEEE 7th International Conference on Wireless and Mobile Computing, Networking and Communications (Wi Mob), Date of Conference: Oct. 10-12, 2011 (Year: 2011).
Kolly et al., "A personal touch: recognizing users based on touch screen behavior", PhoneSense '12: Proceedings of the Third International Workshop on Sensing Applications on Mobile Phones, November (Year: 2012).

* cited by examiner

SYSTEMS AND METHODS FOR PROVIDING SECURITY VIA INTERACTIVE MEDIA

CROSS-REFERENCE TO RELATED APPLICATIONS

This application is a continuation of U.S. application Ser. No. 16/128,751 filed Sep. 12, 2018 entitled, "SYSTEMS AND METHODS FOR PROVIDING SECURITY VIA INTERACTIVE MEDIA," which is a continuation of U.S. application Ser. No. 14/775,378 filed Sep. 11, 2015 entitled, "SYSTEMS AND METHODS FOR PROVIDING SECURITY VIA INTERACTIVE MEDIA," which is a national stage filing under 35 U.S.C. § 371 of International Application No. PCT/US2014/023122 filed Mar. 11, 2014 entitled "SYSTEMS AND METHODS FOR PROVIDING SECURITY VIA INTERACTIVE MEDIA," which in turn claims the priority benefit of U.S. Provisional Patent Application No. 61/778,132, filed Mar. 12, 2013 entitled "SECURITY SYSTEMS USING INTERACTIVE MEDIA," the contents of which are incorporated herein by reference in their entirety.

BACKGROUND

Personal security, particularly with respect to the Internet, has been a primary concern for individuals and business that conduct activities online. Entities devoted to security subversion have become increasingly sophisticated and have been able to circumvent some of the strongest security measures in the world. Accordingly, there exists a constant need for improved security measures.

Illustrative methods of subverting security measures may involve using one or more computing systems, such as a bot, a botnet, and/or the like, to generate an attack. Such methods can be particularly useful in using automated techniques to guess passwords. Previous attempts to prevent such automated techniques have resulted in security measures that use challenge-response testing to determine whether an entity requesting access to an account is a human or a computing system. Such challenge-response testing generally requires an entity to enter characters from a distorted image to verify that the entity is a human user. For a time, the challenge-response testing was successful in verifying an entity was human. However, advances in computing technology have made such challenge-response testing less effective.

Other illustrative methods of subverting security measures may include unauthorized users posing as authorized users to gain access to a secured resource. In such methods, the unauthorized user may have information pertinent to an authorized user that is used to "trick" the security measures into allowing the unauthorized user access to the secured resource. Current methods include requiring an authorized user to provide additional security information when setting up an account, such as, for example, a mother's maiden name, a name of a dog, an old address, and/or the like. However, such information is easily obtainable by unauthorized users.

SUMMARY

In an embodiment, a system may include a processor and a non-transitory, processor-readable storage medium. The non-transitory, processor-readable storage medium may include one or more programming instructions that, when executed, cause the processor to receive a request to access a secured resource, provide a verification challenge to a user via a user interface, receive at least one input from the user in response to the verification challenge, and determine that the at least one input corresponds to at least one parameter indicative of a human user. The verification challenge may include a game.

In an embodiment, a system may include a processor and a non-transitory, processor-readable storage medium. The non-transitory, processor-readable storage medium may include one or more programming instructions that, when executed, cause the processor to receive a request to access a secured resource, provide a verification challenge to a user via a user interface, receive at least one input from the user in response to the verification challenge, and determine that the at least one input does not correspond to at least one parameter indicative of a human user. The verification challenge may include a game.

In an embodiment, a method may include receiving, by a processor, a request to access a secured resource, providing, by the processor, a verification challenge to a user via a user interface, receiving, by the processor, at least one input from the user in response to the verification challenge, and determining, by the processor, that the at least one input corresponds to at least one parameter indicative of a human user. The verification challenge may include a game.

In an embodiment, a method may include receiving, by a processor, a request to access a secured resource, providing, by the processor, a verification challenge to a user via a user interface, receiving, by the processor, at least one input from the user in response to the verification challenge, and determining, by the processor, that the at least one input does not correspond to at least one parameter indicative of a human user. The verification challenge may include a game.

In an embodiment, a system may include a processor and a non-transitory, processor-readable storage medium. The non-transitory, processor-readable storage medium may include one or more programming instructions that, when executed, cause the processor to receive a request to access a secured resource, provide a verification challenge to a user via a user interface, receive at least one input from the user in response to the verification challenge, and determine that the at least one input corresponds to at least one parameter indicative of an authorized user. The verification challenge may include a game.

In an embodiment, a system may include a processor and a non-transitory, processor-readable storage medium. The non-transitory, processor-readable storage medium may include one or more programming instructions that, when executed, cause the processor to receive a request to access a secured resource, provide a verification challenge to a user via a user interface, receive at least one input from the user in response to the verification challenge, and determine that the at least one input does not correspond to at least one parameter indicative of an authorized user. The verification challenge may include a game.

In an embodiment, a method may include receiving, by a processor, a request to access a secured resource, providing, by the processor, a verification challenge to a user via a user interface, receiving, by the processor, at least one input from the user in response to the verification challenge, and determining, by the processor, that the at least one input corresponds to at least one parameter indicative of an authorized user. The verification challenge may include a game.

In an embodiment, a method may include receiving, by a processor, a request to access a secured resource, providing, by the processor, a verification challenge to a user via a user interface, receiving, by the processor, at least one input from the user in response to the verification challenge, and determining, by the processor, that the at least one input does not correspond to at least one parameter indicative of an authorized user. The verification challenge may include a game.

DETAILED DESCRIPTION

Figure 1:
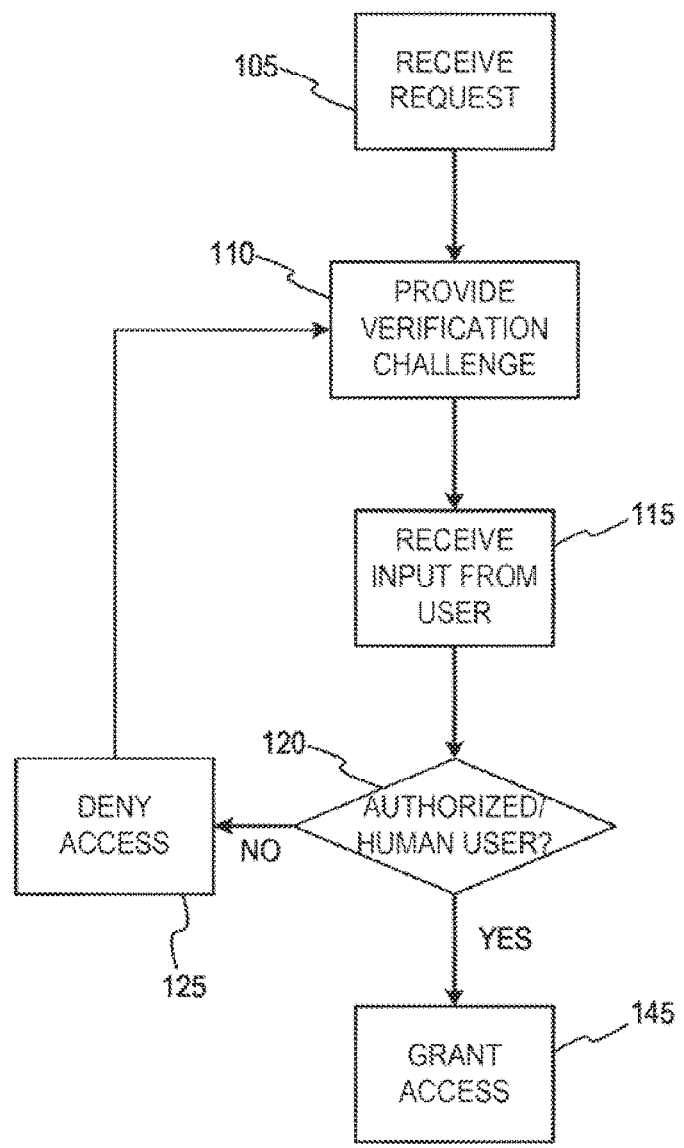
FIG. 1 depicts a flow diagram of an illustrative method of verifying a human user according to an embodiment.

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The following terms shall have, for the purposes of this application, the respective meanings set forth below.

A "user" is not limited by this disclosure, and includes one or more entities or people using of any of the components and/or elements thereof as described herein. For example, a user can be a researcher, an expert, a player, an administrator, a developer, a group of individuals, and/or the like. In some embodiments, interactions between multiple users may be various users of the same category, such as, for example, multiple players, multiple researchers, multiple experts, multiple administrators, multiple developers, multiple groups, and/or the like. In some embodiments, interactions between multiple users may be various users of differing categories, such as, for example, a player and a researcher, a player and an expert, a player and an administrator, and/or the like. A "human user" refers to a user who is a human being that accesses a user interface. A "non-human user" refers to any other user, particularly a machine, a computing device, or the like, that accesses a user interface, usually under the direction of a human user for malicious or non-malicious purposes. The non-human user may also be referred to herein as a "bot." Accordingly, the terms may be used interchangeably herein.

An "electronic device" refers to a device that includes a processor and a tangible, computer-readable memory or storage device. The memory may contain programming instructions that, when executed by the processing device, cause the device to perform one or more operations according to the programming instructions. Examples of electronic devices include personal computers, supercomputers, gaming systems, televisions, mobile devices, medical devices, telescopes, satellites, recording devices, automatic teller machines, kiosks, electronic locks, and/or the like.

A "mobile device" refers to an electronic device that is generally portable in size and nature, or is capable of being operated while in transport. Accordingly, a user may transport a mobile device with relative ease. Examples of mobile devices include pagers, cellular phones, feature phones, smartphones, personal digital assistants (PDAs), cameras, tablet computers, phone-tablet hybrid devices ("phablets"), laptop computers, netbooks, ultrabooks, global positioning satellite (GPS) navigation devices, in-dash automotive components, media players, watches, and the like.

A "computing device" is an electronic device, such as a computer, a processor, a memory, and/or any other component, device or system that performs one or more operations according to one or more programming instructions.

A "secured resource" refers to one or more objects, locations, and/or systems to which access is restricted or partially restricted by a security device and/or a security feature. A secured resource may be, for example, a physical location, such as a building or a room in a building. Such a secured resource may also include a security device such as a locking mechanism on a door. A secured resource may also be an outdoor location, protected by, for example, a fence with a locking gate. A secured resource may also be a garage or parking area, where the security device may be, for example, a garage door or vehicle barrier. A secured resource may be at least one computer and/or components thereof, at least one computer network, at least one electronic device, and/or the like where the security device may be, for example, a microprocessor and/or other electronic circuitry programmed to selectively restrict use of the secured resource.

A "user interface" is an interface which allows a user to interact with a computer or computer system. The user interface may also be referred to as a "human interface device." A user interface may generally provide information or data to the user and/or receive information or data from the user. The user interface may enable input from a user to be received by the computer and may provide output to the user from the computer. Accordingly, the user interface may allow a user to control or manipulate a computer and may allow the computer to indicate the effects of the user's control or manipulation. The display of data or information on a display or a graphical user interface is a non-limiting example of providing information to a user. The receiving of data through a keyboard, mouse, trackball, touchpad, pointing stick, graphics tablet, joystick, gamepad, webcam, headset, gear sticks, steering wheel, pedals, wired glove, dance pad, remote control, and accelerometer are non-limiting examples of user interface components which enable the receiving of information or data from a user.

"Gameplay" refers to a specific way in which one or more users interact with a game and includes all interaction between the one or more users and the game. Gameplay can be a pattern defined through one or more game rules, a connection between a user and the game, a challenge presented to a user from the game, a method employed by a user in overcoming the challenges, a plot of the game, turn-by-turn directions in a game, a user's interaction with computer-generated characters and situations, a user's interaction with other users, and a user's connection to the game. The gameplay can be interesting, therapeutic, beneficial, and/or engaging to the user, thereby increasing the likelihood that the user interacts with the game for extended periods of time, provides high-quality inputs (for example, relevant and significant inputs), and returns to play the game multiple times.

A "game" refers to a board game, an electronic game, a gesture-based game, a massively multiplayer online game (MMOG), a social network-based game, a complex game, and/or the like, and may further include any number of activities, exercises, and interactions. The game may be created by a software developer, an administrator, or the like. In some embodiments, creation of the game may be completed by a user based upon the user's interaction with another game. While the present disclosure generally relates to games for verifying a human user, those skilled in the art will recognize that the scope of the present disclosure may additionally relate to entertainment, therapeutic exercises, learning and development exercises, medical diagnosis exercises, feedback gathering exercises, proof of human input systems, exercises for assessment and evaluation, interactive advertising, newsfeed gathering, personal content organization, and the like. Furthermore, the data collected from activities presented herein may further be used for purposes such as data mining, information retrieval, data organization, data sorting, data indexing, analytic gathering, known problems, and scientific problems. In some embodiments, the data may be used for advertising content customization and/or recommendations systems.

Current techniques for providing a security feature and restricting access to a secured resource include, for example, a security keypad and/or a card reader that is physically present at the entrance to a location or on an electronic device, security firewalls that interface on an electronic device or through a network, and measures that prevent non-human access to a secured resource such as a Completely Automated Public Turing test to tell Computers and Humans Apart (CAPTCHA). Such security features are subject to circumvention due to passcode/PIN number theft via shoulder surfing, guesswork, and/or the like. Certain biometric features may be useful in avoiding circumvention attempts, but may be more expensive and may require sophisticated algorithms and resources to implement.

The present disclosure relates generally to systems and methods for providing a security feature that verifies that a user requesting access to a secured resource is a human user and/or an authorized user. The security feature may incorporate an interactive interface for the user to play a game. The security feature only allows access to human users after the game is played under particular parameters such that a human presence at the interactive interface is verified. The security feature also only allows access to authorized users by learning particular inputs and/or obtaining particular data specific to an authorized user that an unauthorized user would not be able to fake or obtain. Thus, the security feature may be adaptive such that it can learn how a user thinks and/or behaves over time and adapt to the learned information. Accordingly, the security feature, after learning about a user, is capable of intelligently recognizing the user. In some embodiments, the systems and methods described herein can be used in a clinical setting, such as, for example, to ensure that a user is sufficiently cognitively aware to gain access to the secured resource. Thus, if a user with a cognitive impairment wishes to unlock a door, he/she may be required to correctly provide inputs in response to a verification challenge that confirm his/her cognitive awareness.

FIGS. 1-4 depict flow diagrams of illustrative methods of verifying a human user and/or an authorized user according to various embodiments. The methods depicted in FIGS. 1-4 may be used alternatively or in conjunction with each other. Thus, for example, the method of FIG. 2 may be incorporated with the method of FIG. 4 such that the processes performed according to both figures are completed.

FIG. 1 depicts a flow diagram of a first illustrative method of verifying a human user and/or an authorized user according to an embodiment. The method may include receiving 105 a request, such as, for example, a request to access a secured resource. The request may generally come from a user, particularly a user of an electronic device. The request is not limited by this disclosure, and may generally be any type of request. For example, a request may be received 105 when a user clicks on a link to a secured resource, when a user attempts to enter a password, a passcode, a PIN number, and/or the like, when a user types a web address of a secure server, when a user provides biometric data (such as a fingerprint or a retinal scan) to a secure entry interface, when a user attempts to purchase an item, when a user activates an electronic device, when a user turns an electronic device on, and/or the like.

The method may further include providing 110 a verification challenge to the user. In some embodiments, the verification challenge may generally be any challenge that verifies the user is a human user. Thus, the verification challenge provides a method of determining whether a user is human or non-human, such as a bot. In some embodiments, the verification challenge may generally be any challenge that verifies the user is an authorized user. Thus, the verification challenge provides a method of determining whether a user is authorized or unauthorized. In some embodiments, the verification challenge may be a game. Illustrative games include, but are not limited to, a floating balloon game, a maze game, a cutting game, a puzzle game, and a memory game. In some embodiments, the verification challenge may include one or more requests that the user complete certain tasks. In some embodiments, providing 110 the verification challenge may further include stipulating that the user provide information regarding other users that is known only to the user. For example, a user may need to know an aspect of another user's gameplay, achievements, avatars, collectibles, levels, status, and/or the like in order to respond to a verification challenge. Accordingly, in instances where a hacker has obtained the user's information, he/she would not be able to access the secured resource without obtaining information regarding additional users. Illustrative verification challenges will be described in greater detail with respect to FIGS. 7-12 herein.

At least one input may be received 115 from the user in response to the provided 110 verification challenge. The at least one input may correspond to one or more of the user's responses to the verification challenge. Illustrative inputs may include keystrokes, gestures, audio inputs, video inputs, haptic inputs, and/or various touch commands, such as, for example, a swipe, a tap, a double tap, a pinch, and/or the like. In some embodiments, the input may be received 115 over a particular period of time, as described in greater detail herein. The number of inputs is not limited by this disclosure, and may generally be any number that is provided by the user, particularly a number of inputs necessary to respond to the verification challenge. In some embodiments, no input may be received. For example, if an input is not received within a particular period of time, it may be determined that no input has been received. The period of time is not limited by this disclosure, and may generally be any period of time. Illustrative periods of time may include, but are not limited to, about 30 seconds, about 1 minute, about 2 minutes, about 3 minutes, about 4 minutes, about 5 minutes, about 6 minutes, about 7 minutes, about 8 minutes, about 9 minutes, about 10 minutes or greater, or any value or range between any two of these values (including endpoints). In such an instance, the request is treated as non-responsive and access is denied 125 to the user, as described in greater detail herein.

The method may further include determining 120 whether the inputs received 115 correspond to inputs expected of a human user and/or an authorized user. Such a determining step may include, for example, any one of receiving each input, determining a timing of the input, receiving inputs from one or more sensors, and/or receiving location data.

Determining a timing of each input may generally include observing an amount of time that elapses between when the verification challenge is provided 110 and when the input (or first input in a series of inputs) is received 115. The amount of time may generally be an expected amount of time necessary for the user to respond to the challenge. Such an expected amount of time may be developed via observation, testing, estimation, experience, and/or the like. In some embodiments, the expected amount of time may be a range of expected amounts of time. In some embodiments, the expected amount of time may be an amount of time that has been learned after observing the authorized user's tendencies over several login attempts to determine how much time the user takes to provide the inputs. If the input (or first input in a series of inputs) is received from the user outside of the expected time, it may be determined that the user is non-human or unauthorized. For example, if an input is received at a time that is less than the expected time, such an input may be determined as being received from non-humans, as computers, machines, and/or the like may be capable of responding to stimuli much more quickly than a human would be able to respond. Similarly, if an input is received at a time that is greater than the expected time, such an input may be determined as being received from a non-human or an unauthorized user. In particular, computers, machines and/or the like may be capable of copying the verification challenge and attempting numerous iterations to determine how to bypass it before providing an input. Similarly, unauthorized users may be capable of taking extra time to determine an appropriate input, such as by researching a correct response and/or the like. In some embodiments, determining a timing of a plurality of inputs may include observing pauses and/or periods of inactivity between inputs. Such pauses and/or periods of inactivity may be indicative of a human or a non-human user, as well as an authorized or unauthorized user, depending on the type of verification challenge.

Receiving an input from one or more sensors may generally include receiving information gathered by a sensor and using the information to determine whether the user is a human and/or authorized. The type of sensor is not limited by this disclosure, and may be any device capable of receiving stimuli. Illustrative examples of sensors may include, but are not limited to, a biometric sensor, a camera, a microphone, a touch sensor, a motion sensor, an accelerometer, a barometer, an infrared sensor, and/or the like. For example, a biometric sensor may be used to determine if a user is human by obtaining a retinal scan, a fingerprint, a handprint, a body temperature reading, and/or any other type of measurement that would reasonably only come from a human, as machines, computers, and/or the like would have difficulty replicating biometrically obtained information. Furthermore, a biometric sensor may be used to verify that the human user is an authorized human user by reading biometric markers that an unauthorized user would not be able to fake or could not reasonably know/discover. In another example, a camera may be used to view the user and/or recognize a body part, such as a face, of the user to verify that the user is human and/or an authorized human. In another example, a microphone may be used to receive audio inputs from a user, such as voice commands, whistling, and/or the like. In some embodiments, the biometrically obtained information may be used to determine whether the user is under duress (for example, by measuring pulse rate, eye movement, respiration rate, perspiration, and/or the like). Such a determination may be an indicator that the user is being forced to enter information against his/her own will.

Receiving location data may generally be obtained using one or more geolocation technologies. For example, location data may be received via a global positioning satellite (GPS) system, via a cellular telephone network system, via a wireless communication protocol system, and/or the like. Such location data may be used to verify that the user is located in an expected area. For example, a permanently-located keypad in Denver, Colo. would reasonably be expected to transmit geolocation coordinates that correspond to its permanent installation when it receives inputs from a user. However, if inputs are received from a bot that is located in Czechoslovakia or from a masked location, it may be recognized that a human is not attempting to access the secured resource at the keypad location in Denver.

In some embodiments, determining 120 may additionally account for various known and/or learned physiological features of an authorized human user. For example, if a human user is red-green color blind and such a trait is known and/or learned, the verification challenge may provide an arrangement of red objects, green objects, white objects, and other-colored objects and request that the user select all colored objects, while knowing that the red-green color blind user will not select any of the red or green objects, but will select other-colored objects and omit the white objects. Thus, determining 120 may be based on whether any red or green objects were selected.

If the determination 120 is that the user is human and/or authorized, access to the secured resource may be granted 145. However, if the determination 120 is that the user is non-human and/or unauthorized, access to the secured resource may be denied 125. Denial 125 of access may generally include disallowing the user from accessing the secured resource. In some embodiments, such as in instances when a bona fide human user or a bona fide authorized user makes an error during the verification challenge, he/she may be allowed to attempt the verification challenge again, at which the verification challenge may be provided 110 again, and new inputs may be received 115 from the user. In some embodiments, a different verification challenge may be provided 110. In other embodiments, the same verification challenge may be provided 110. In some embodiments, the number of times a user may be provided 110 with a verification challenge without providing a correct response may be limited. Such a limitation may prevent recurring incorrect attempts by a non-human user to access the secured resource. The number of times that a verification challenge may be provided 110 without receiving a correct response is not limited by this disclosure, and may include, for example, about 2 times, about 3 times, about 5 times, about 10 times, or any value or range between any two of these values (including endpoints).

Figure 2:
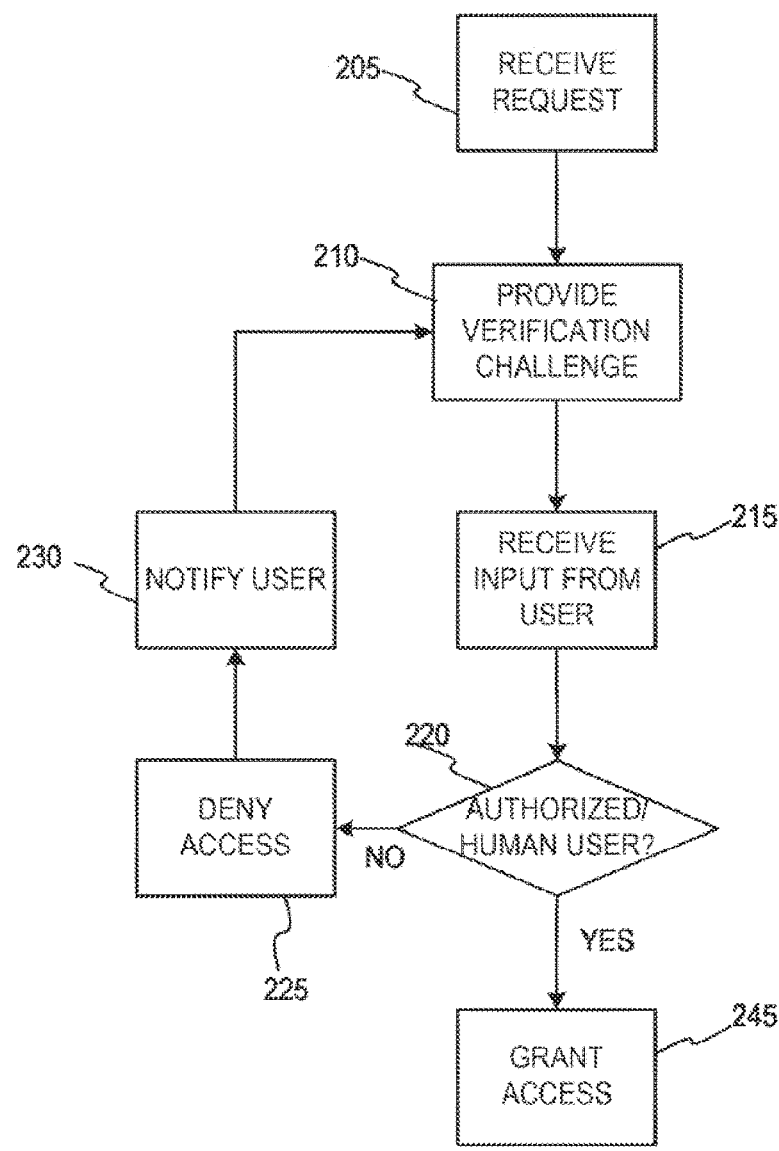
FIG. 2 depicts a flow diagram of a second illustrative method of verifying a human user according to an embodiment.

In some embodiments, as shown in FIG. 2, in addition to denying 225 access to the determined 220 non-human or unauthorized user, the user may be notified 230 of the denial of access. The notification 230 is not limited by this disclosure, and may generally be any notification, including, but not limited to, a text notification, an audio notification, a video notification, an alert, and/or the like. In some embodiments, the type of notification may be dependent upon the interface device used by the user to access the secured resource. For example, if the user attempts to access the secure device via a smartphone equipped with a speaker, the notification may be an audio alert, such as a chime or a ding, to notify the user of the denied 225 access. In some embodiments, as described in greater detail herein, the user may be provided 210 with the verification challenge again.

Figure 3:
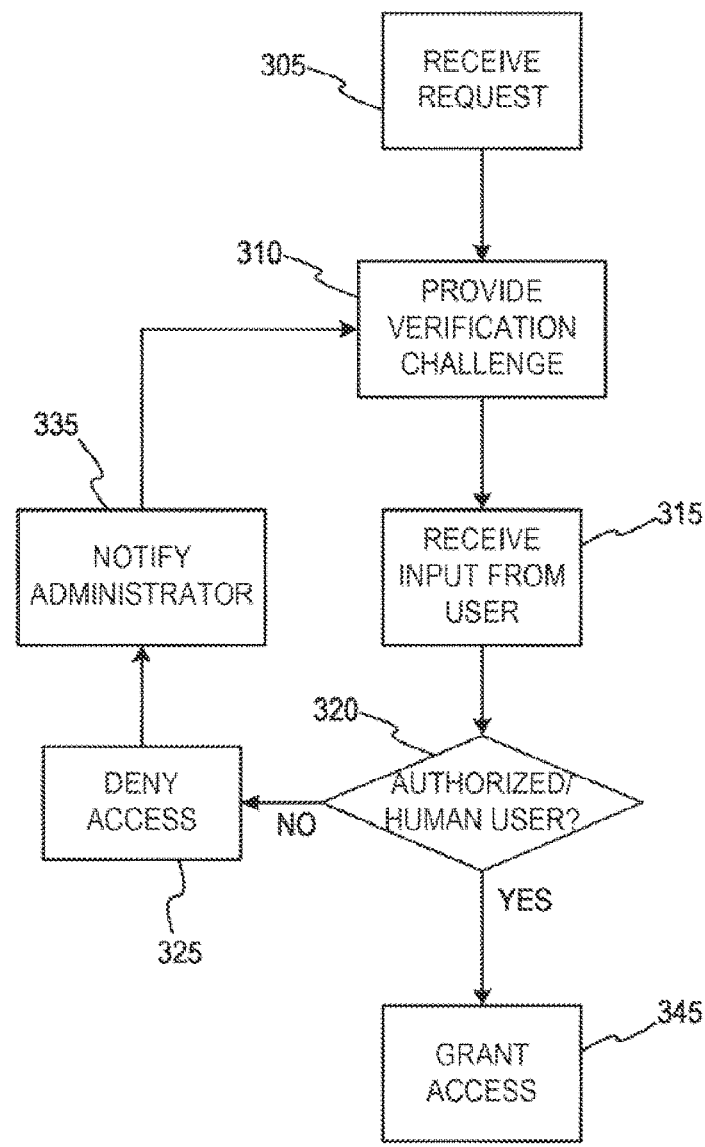
FIG. 3 depicts a flow diagram of a third illustrative method of verifying a human user according to an embodiment.

In some embodiments, as shown in FIG. 3, in addition to denying 325 access to the determined 320 non-human or unauthorized user, an administrator may be notified of the denial of access. The administrator is not limited by this disclosure, and may be any person or entity that may benefit from such a notification 335. For example, a user or entity that controls the secured resource may be notified 335. The notification 335 is not limited herein, and may be any type of notification, including, but not limited to, a text notification, an audio notification, a video notification, an alert, identification of the resource, identification of the user interface and/or the device used to access the user interface, and/or the like. For example, the notification 335 may be an email alert sent to the administrator noting the details of the denied 325 access, such as, for example, the type of verification challenge, the inputs that were received 315, various sensor data that was obtained, location data, a date and time of the denied access, and/or the like. In some embodiments, as described in greater detail herein, the user may be provided 310 with the verification challenge again.

Figure 4:
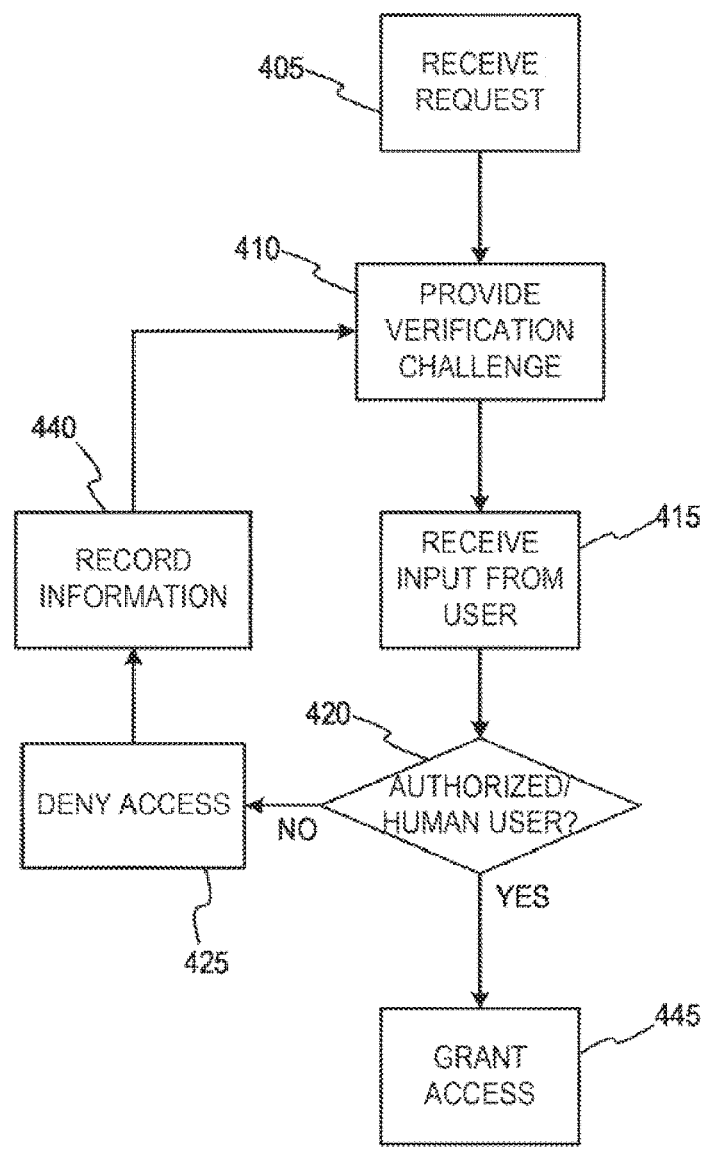
FIG. 4 depicts a flow diagram of a fourth illustrative method of verifying a human user according to an embodiment.

In some embodiments, as shown in FIG. 4, in addition to denying 425 access to the determined 420 non-human or unauthorized user, information may be recorded 440 regarding the denial of access. The information is not limited by this disclosure, and may generally be any information that is pertinent to the denial 425 of access to the secured resource. Illustrative examples of information that may be recorded 440 include, but are not limited to, the type of verification challenge, the inputs that were received 415, various sensor data that was obtained, location data, a date and time of the denied access, identification of the resource, identification of the user interface and/or the device used to access the user interface, and/or the like. In some embodiments, as described in greater detail herein, the user may be provided 410 with the verification challenge again.

Figure 5:
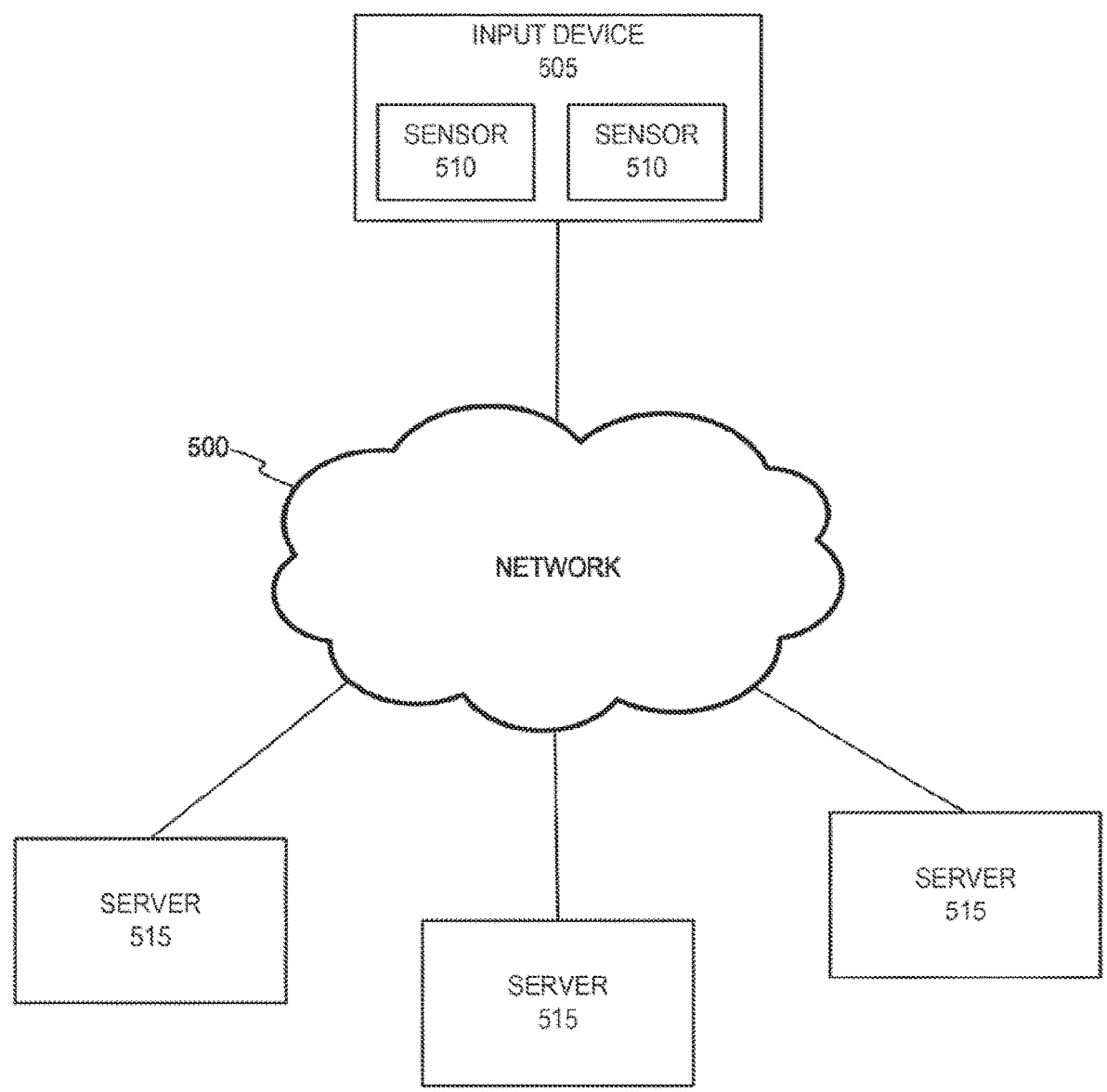
FIG. 5 depicts a block diagram of an illustrative networked system according to an embodiment.

FIG. 5 depicts an illustrative networked system according to an embodiment. The system may generally include at least one server 515 and at least one input device 505. The at least one server 515 may communicate with the at least one input device 505 via any communications protocol now known or later developed. In some embodiments, the server 515 and the input device 505 may communicate via a network 500, such as, for example, the internet, an intranet, a wide area network, a personal network, and/or the like.

The server 515 may generally contain at least a portion of the secured resource and/or may be configured to provide access to the secured resource, as described in greater detail herein. The server 515 is not limited by this disclosure, and may be any computing device and/or components thereof, such as, for example, the computing device described herein with respect to FIG. 6.

The input device 505 may generally be a device that receives inputs from a user, as described in greater detail herein. In some embodiments, the input device 505 may contain and/or implement a user interface to allow the user to access the secured resource. In some embodiments, the input device 505 may contain at least a portion of the secured resource in a storage device therein. The input device 505 is not limited by this disclosure, and may be any electronic device and/or components thereof, including, for example, at least one sensor 510. In some embodiments, the input device 505 may be a user's personal electronic device, such as, for example, a computer, a smartphone, a tablet, and/or the like.

In some embodiments, the input device 505 may be a supplemental means of providing, receiving, and/or processing the inputs received from the user. For example, the input device 505 may include an optical filter module in a touch screen interface that is configured to change a color of a displayed object that is not directed by the server 515. Thus, for example, the server 515 may request that a user click on all circles that are colored a certain way, but the input device 505 selects the actual coloring of each circle and never communicates coloring data to the server 515. Such an arrangement may prevent a malicious attacker from attempting to bypass the input device 505 to access the secured resource directly from the server 515.

The input device 505 may additionally be configured to provide additional information to the server 515 at the time it receives inputs from the user. For example, the input device 505 may be configured to receive information from at least one sensor 510. The sensor may include, but is not limited to, a biometric sensor, a camera, a microphone, a touch sensor, a motion sensor, an accelerometer, a barometer, an infrared sensor, and/or the like, as described in greater detail herein. Illustrative information may include, but is not limited to, biometric data of the user interacting with the input device 505, imaging information, sound information, touch information, pressure information, device movement information, device location, information regarding the environment in which the device is located, and/or the like. In some embodiments, the sensor 510 may be configured to sense the amount of pressure the user places on the input device 505 when responding to a challenge. In some embodiments, the sensor 510 may receive information regarding a user's eye movements. In some embodiments, the sensor 510 may receive information regarding environmental parameters, such as, for example, moisture and/or smoke.

Figure 6:
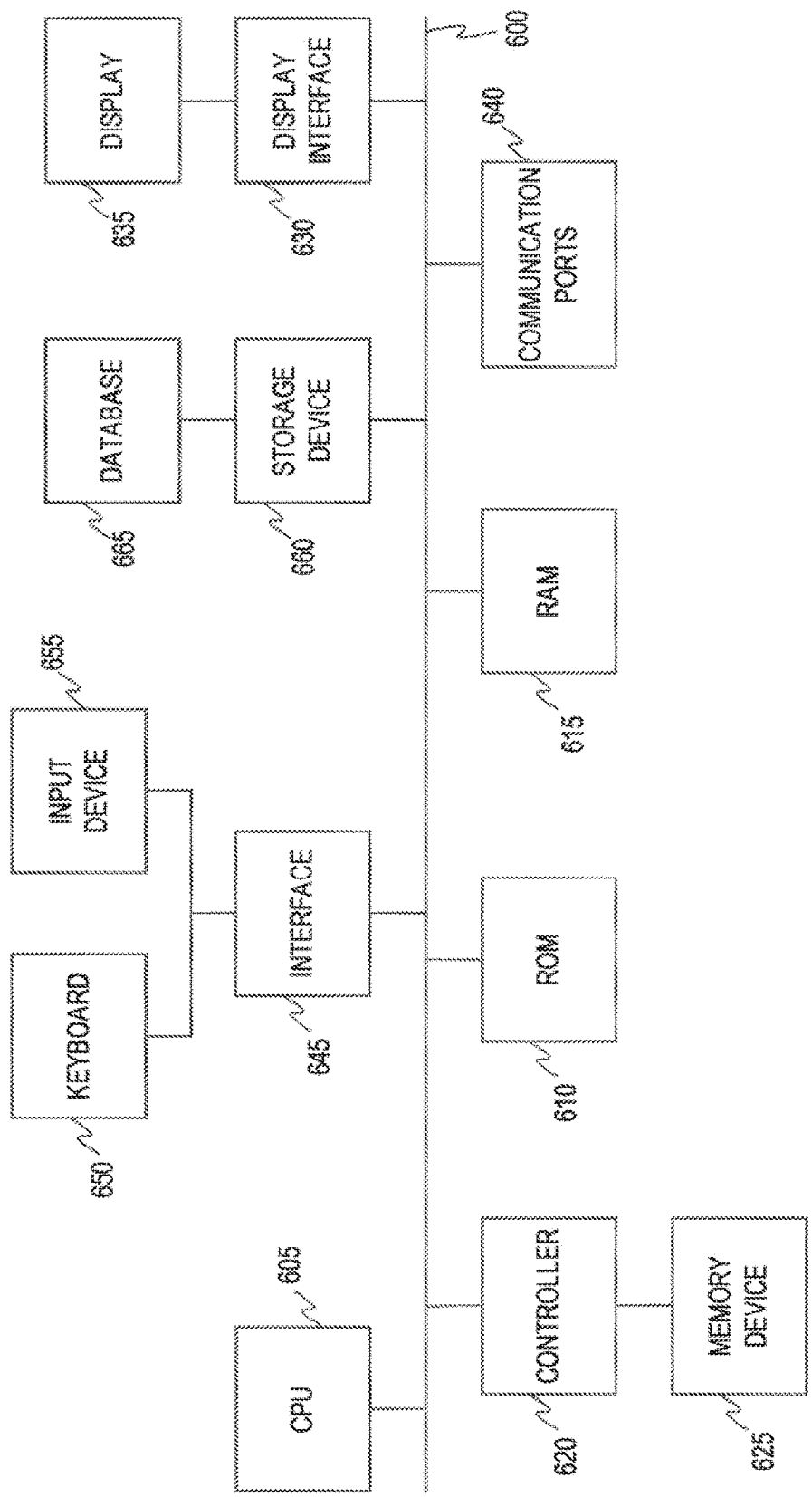
FIG. 6 depicts a block diagram of an illustrative computing device according to an embodiment.

FIG. 6 depicts a block diagram of illustrative internal hardware that may be used to contain or implement program instructions, such as the process steps discussed herein, according to various embodiments. A bus 600 may serve as the main information highway interconnecting the other illustrated components of the hardware. A CPU 605 is the central processing unit of the system, performing calculations and logic operations required to execute a program.

The CPU 605, alone or in conjunction with one or more of the other elements disclosed in FIG. 6, is an illustrative processing device, computing device or processor as such terms are used within this disclosure. Read only memory (ROM) 610 and random access memory (RAM) 615 constitute illustrative memory devices (i.e., processor-readable non-transitory storage media).

A controller 620 interfaces with one or more optional memory devices 625 to the system bus 600. These memory devices 625 may include, for example, an external or internal DVD drive, a CD ROM drive, a hard drive, flash memory, a USB drive, or the like. As indicated previously, these various drives and controllers are optional devices.

Program instructions, software, or interactive modules for providing the interface and performing any querying or analysis associated with one or more data sets may be stored in the ROM 610 and/or the RAM 615. Optionally, the program instructions may be stored on a tangible computer-readable medium such as a compact disk, a digital disk, flash memory, a memory card, a USB drive, an optical disc storage medium, such as a Blu-Ray™ disc, and/or other non-transitory storage media.

An optional display interface 630 may permit information from the bus 300 to be displayed on the display 635 in audio, visual, graphic, or alphanumeric format, such as the interface previously described herein. Communication with external devices, such as a print device, may occur using various communication ports 640. An illustrative communication port 640 may be attached to a communications network, such as the Internet, an intranet, or the like.

The hardware may also include an interface 645 which allows for receipt of data from input devices such as a keyboard 650 or other input device 655 such as a mouse, a joystick, a touch screen, a remote control, a pointing device, a video input device and/or an audio input device.

The hardware may also include a storage device 660 such as, for example, a connected storage device, a server, and an offsite remote storage device. Illustrative offsite remote storage devices may include hard disk drives, optical drives, tape drives, cloud storage drives, and/or the like. The storage device 660 may be configured to store data as described herein, which may optionally be stored on a database 665. The database 665 may be configured to store information in such a manner that it can be indexed and searched, as described herein.

The computing device of FIG. 6 and/or components thereof may be used to carry out the various processes as described herein.

FIGS. 7-12 depict illustrative user interfaces according to various embodiments. The various user interfaces described herein are not limited by this disclosure and may be provided on any type of device. Illustrative examples include a computing device, an electronic device, a mobile device, and a physical installation, such as a freestanding PIN pad or the like. Thus, a user may interact with the user interface by using an interface device such as a keyboard, a mouse, a touch screen, and/or the like, or by interacting with physical elements. The user interface may generally display information for the user in a manner that allows the user to visualize and/or manipulate the information. In some embodiments, the user interface may provide a game, monitor the user's inputs in following instructions, attempting the game, and/or completing the game, and/or store the inputs such that a user's tendencies can be learned. Some non-limiting, illustrative user interfaces that may be used are described below.

Figure 7:
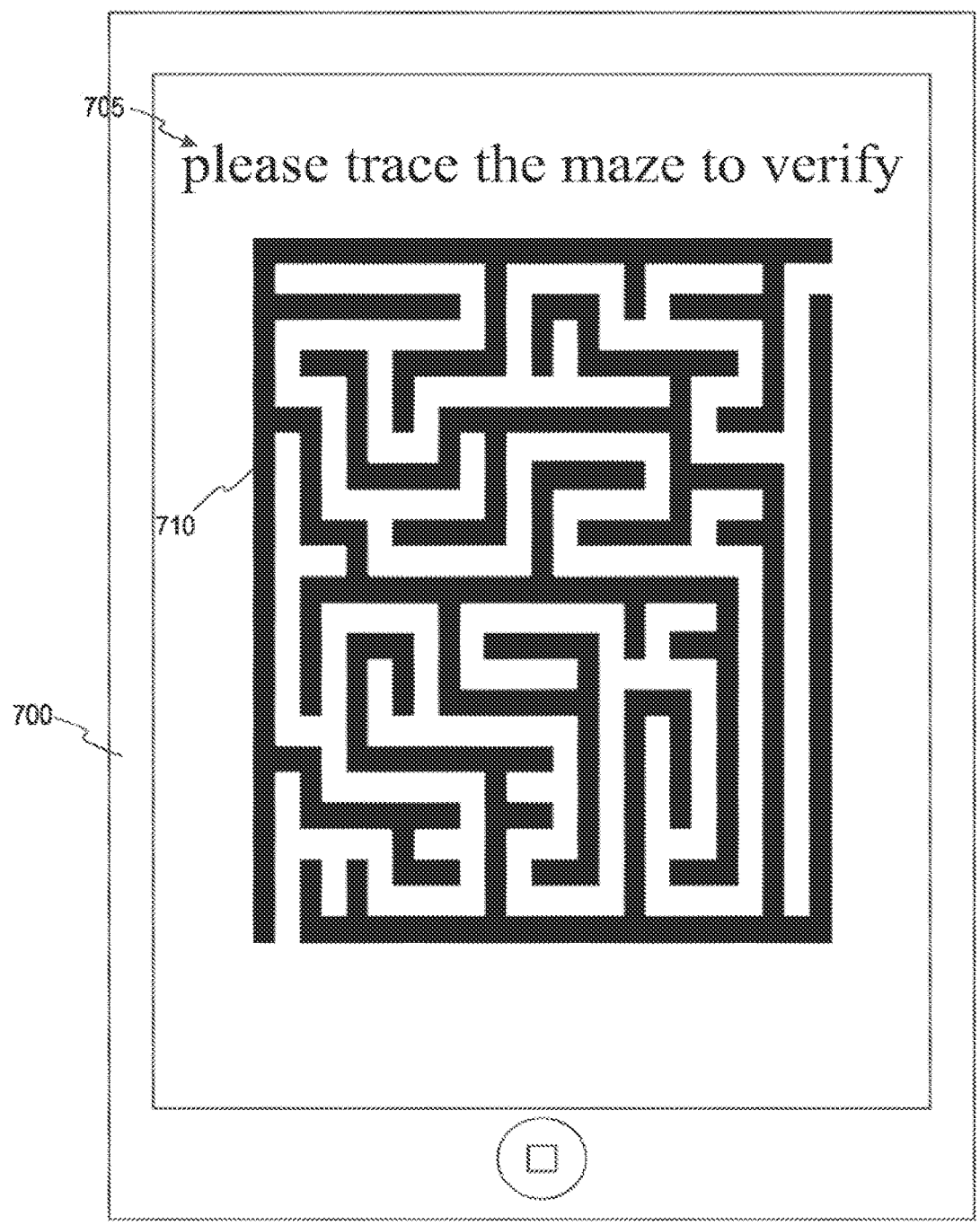
FIG. 7 depicts an illustrative verification challenge according to an embodiment.

FIG. 7 depicts an illustrative user interface, generally designated 700, according to an embodiment. The user interface 700 may generally be configured to provide a command area 705 containing instructions for the user to follow and/or a response area 710 for receiving inputs from the user in response to the instructions provided in the command area. In some embodiments, the command area 705 may be provided at substantially the same time as the response area 710. In other embodiments, the command area 705 may be provided prior to the response area 710. Accordingly, the user may be required to remember the instructions in the command area 705 before providing a response, thereby providing an additional layer of protection against unauthorized users. As shown in FIG. 7, the response area 710 may be a maze. In such a response area 710, the user may generally be required to trace a path from a start portion to and end portion of the maze to verify that he/she is a human user to access the secured resource. In some embodiments, each path in the maze taken by the user may be unique and may be known to the user before traversing the maze and/or traversed in a particular amount of time. In some embodiments, the maze may include one or more signposts or the like that may be traversed in a particular order that is unique to the user.

Figure 8:
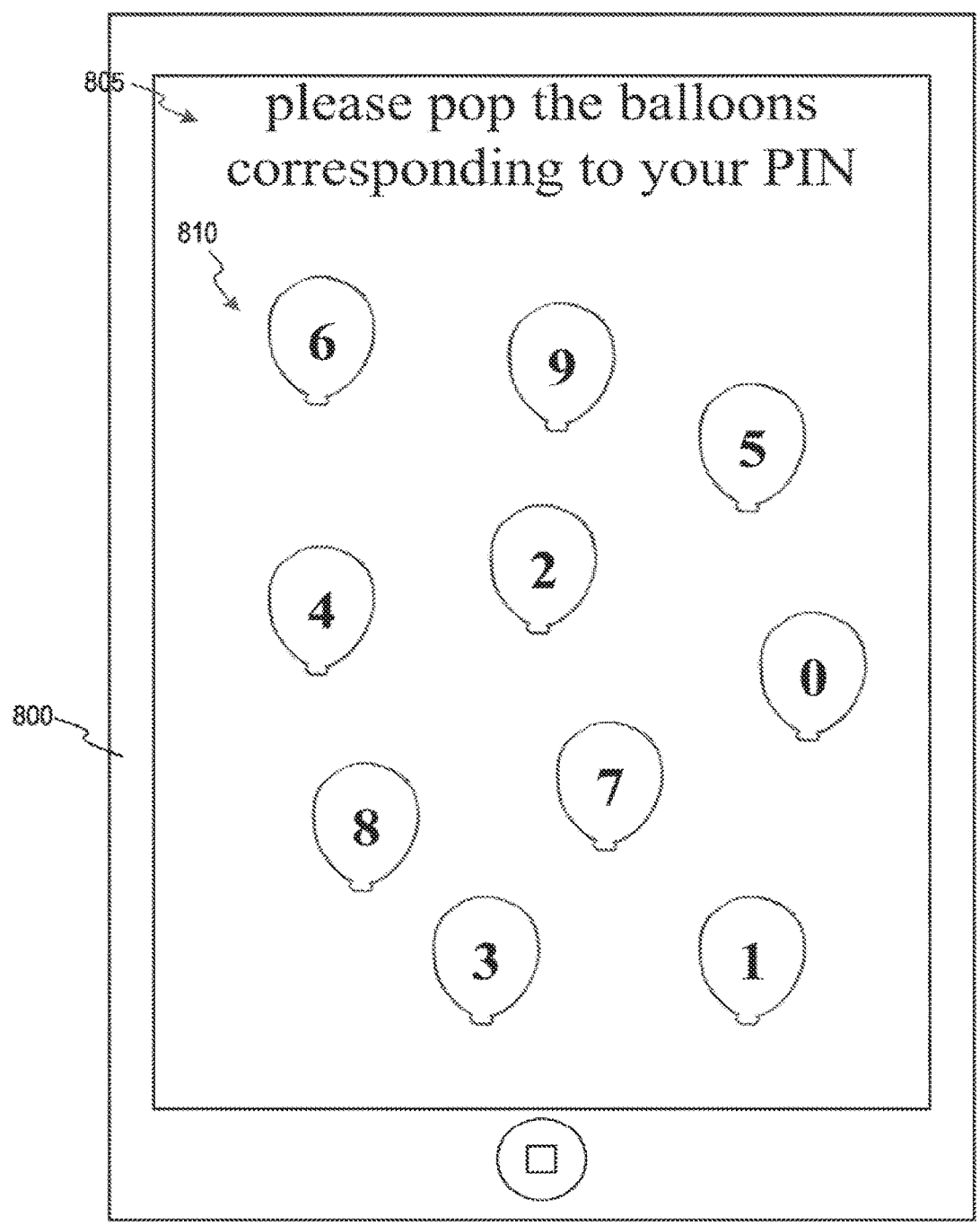
FIG. 8 depicts a second illustrative verification challenge according to an embodiment.

Similar to FIG. 7, FIG. 8 depicts an illustrative user interface, generally designated 800, according to an embodiment. The user interface 800 may generally provide a command area 805 containing instructions for the user to follow and/or a response area 810 for receiving inputs from the user in response to the instructions provided in the command area. In some embodiments, the command area 805 may be provided at substantially the same time as the response area 810. In other embodiments, the command area 805 may be provided prior to the response area 810. Accordingly, the user may be required to remember the instructions in the command area 805 before providing a response, thereby providing an additional layer of protection against unauthorized users. As shown in FIG. 8, the response area 810 may contain a plurality of objects, such as, for example, balloons. Each object may be in a fixed location or may move around the user interface. In some embodiments, the location of each object may be random. Each object may contain, for example, a character such as a number, a letter, a symbol, and/or the like. In such a response area 810, the user may generally be required to complete a task to "input" a particular character. In some embodiments, the user may enter a specific sequence of characters such as a PIN number by tapping and/or clicking on the object that corresponds to the specific sequence. In particular embodiments where the object is moving, the user may tap and/or click in varying locations depending on the location of the object containing the character he/she wishes to select. Such embodiments may discourage bots, which may not be able to track the movement of each object and/or select an appropriate sequence of characters. In addition, it may be difficult for a shoulder-surfing person to obtain the PIN code because of the random placement and/or movement of the objects.

Figure 9:
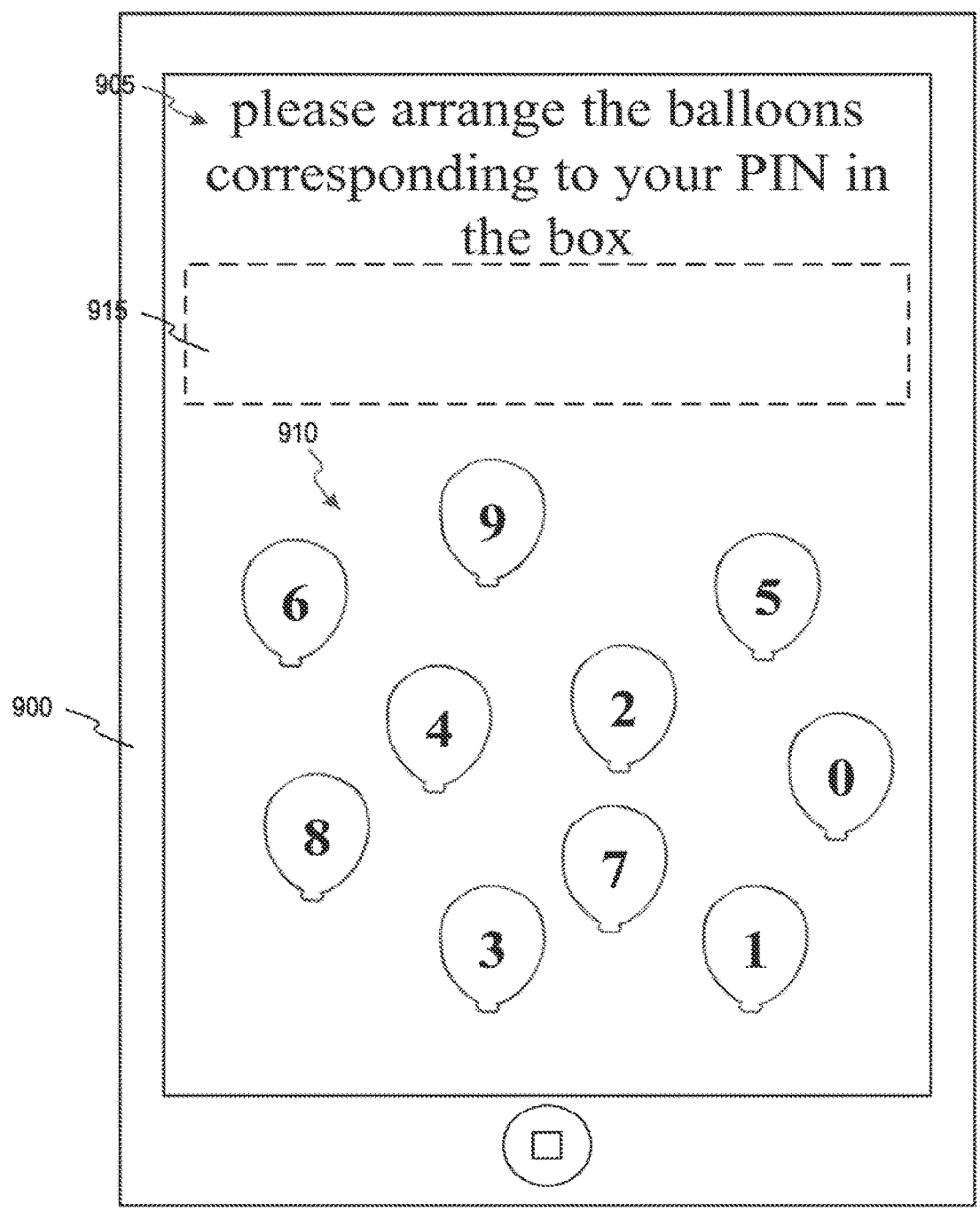
FIG. 9 depicts a third illustrative verification challenge according to an embodiment.

FIG. 9 depicts an illustrative user interface, generally designated 900, according to an embodiment. The user interface 900 may generally provide a command area 905 containing instructions for the user to follow, a first response area 910, and/or a second response area 915. A user may generally provide one or more inputs in response to the command in at least one of the first response area 910 and the second response area 915. In some embodiments, the command area 905 may be provided at substantially the same time as at least one of the first response area 910 and the second response area 915. In other embodiments, the command area 905 may be provided prior to at least one of the first response area 910 and the second response area 915. Accordingly, the user may be required to remember the instructions in the command area 905 before providing a response, thereby providing an additional layer of protection against unauthorized users. As shown in FIG. 9, the first response area 910 may contain a plurality of objects, such as, for example, balloons. Each object may be in a fixed location or may move around the user interface. In some embodiments, the location of each object may be random. Each object may contain, for example, a character such as a number, a letter, a symbol, and/or the like. In the first response area 910, the user may generally be required to complete a task to "input" a particular character. In some embodiments, the user may enter a specific sequence of characters such as a PIN number by tapping, clicking, and/or dragging on the object that corresponds to the specific sequence to the second response area 915. In particular embodiments where the object is moving, the user may tap and/or click in varying locations depending on the location of the object containing the character he/she wishes to select. Such embodiments may discourage bots, which may not be able to track the movement of each object and/or select an appropriate sequence of characters. In some embodiments, the user may rearrange the objects in the second response area 915 after they have been moved from the first response area 910.

Figure 10:
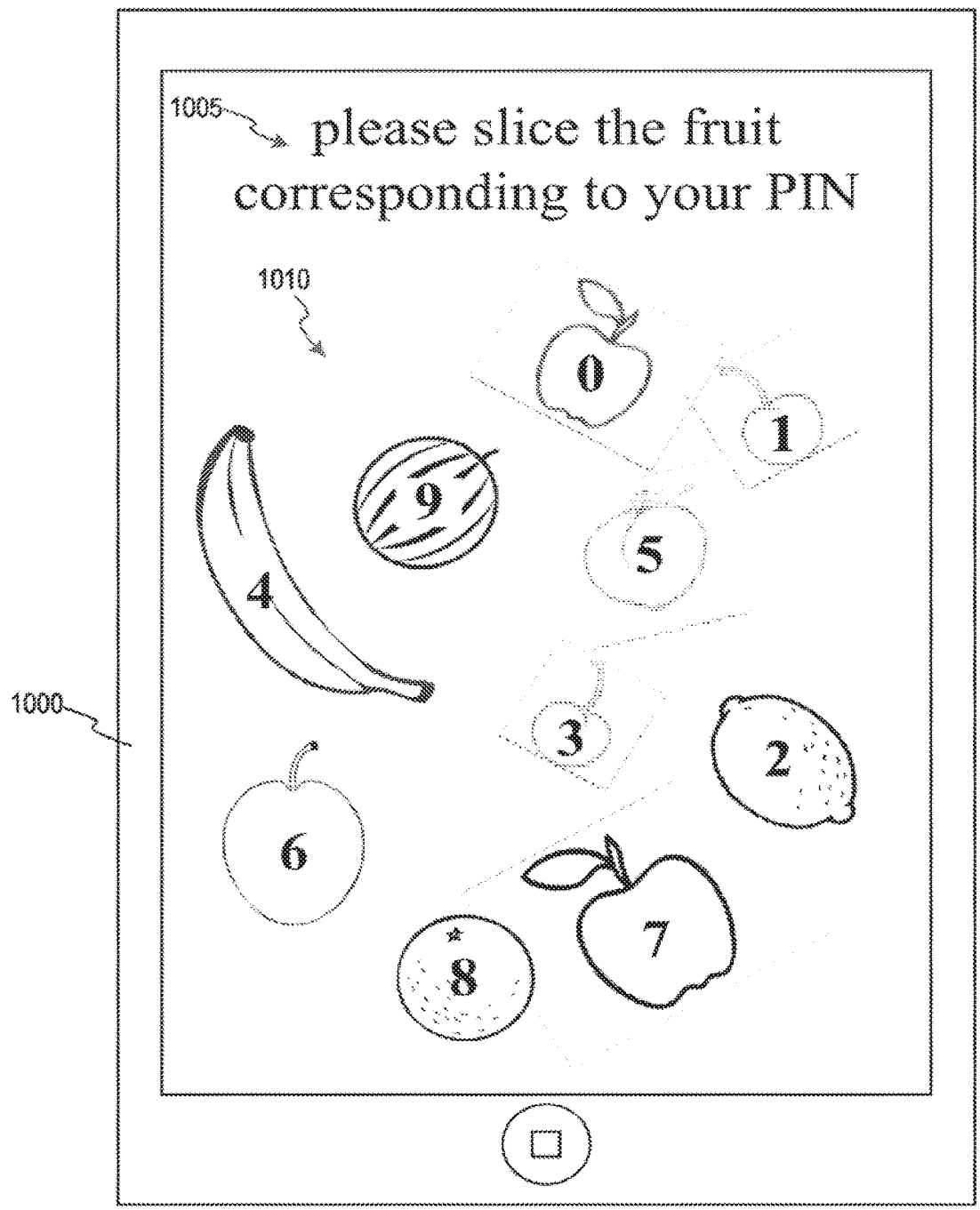
FIG. 10 depicts a fourth illustrative verification challenge according to an embodiment.

FIG. 10 depicts an illustrative user interface, generally designated 1000, according to an embodiment. The user interface 1000 may generally provide a command area 1005 containing instructions for the user to follow and/or a response area 1010 for receiving inputs from the user in response to the instructions provided in the command area. In some embodiments, the command area 1005 may be provided at substantially the same time as the response area 1010. In other embodiments, the command area 1005 may be provided prior to the response area 1010. Accordingly, the user may be required to remember the instructions in the command area 1005 before providing a response, thereby providing an additional layer of protection against unauthorized users. As shown in FIG. 10, the response area 1010 may contain a plurality of objects, such as, for example, fruit. Thus, the objects in the response area 1010 may vary in size and/or shape. Each object may be in a fixed location or may move around the user interface. In some embodiments, the location of each object may be random. Each object may contain, for example, a character such as a number, a letter, a symbol, and/or the like. In such a response area 1010, the user may generally be required to complete a task to "input" a particular character, such as, for example, slicing the fruit. In some embodiments, the user may enter a specific sequence of characters such as a PIN number by tapping, clicking, swiping, and/or the like on the object that corresponds to the specific sequence. In particular embodiments where the object is moving, the user may provide an input in varying locations depending on the location of the object containing the character he/she wishes to select. Such embodiments may discourage bots, which may not be able to track the movement of each object, select an appropriate sequence of characters, and/or provide the necessary "slicing" motions.

Figure 11:
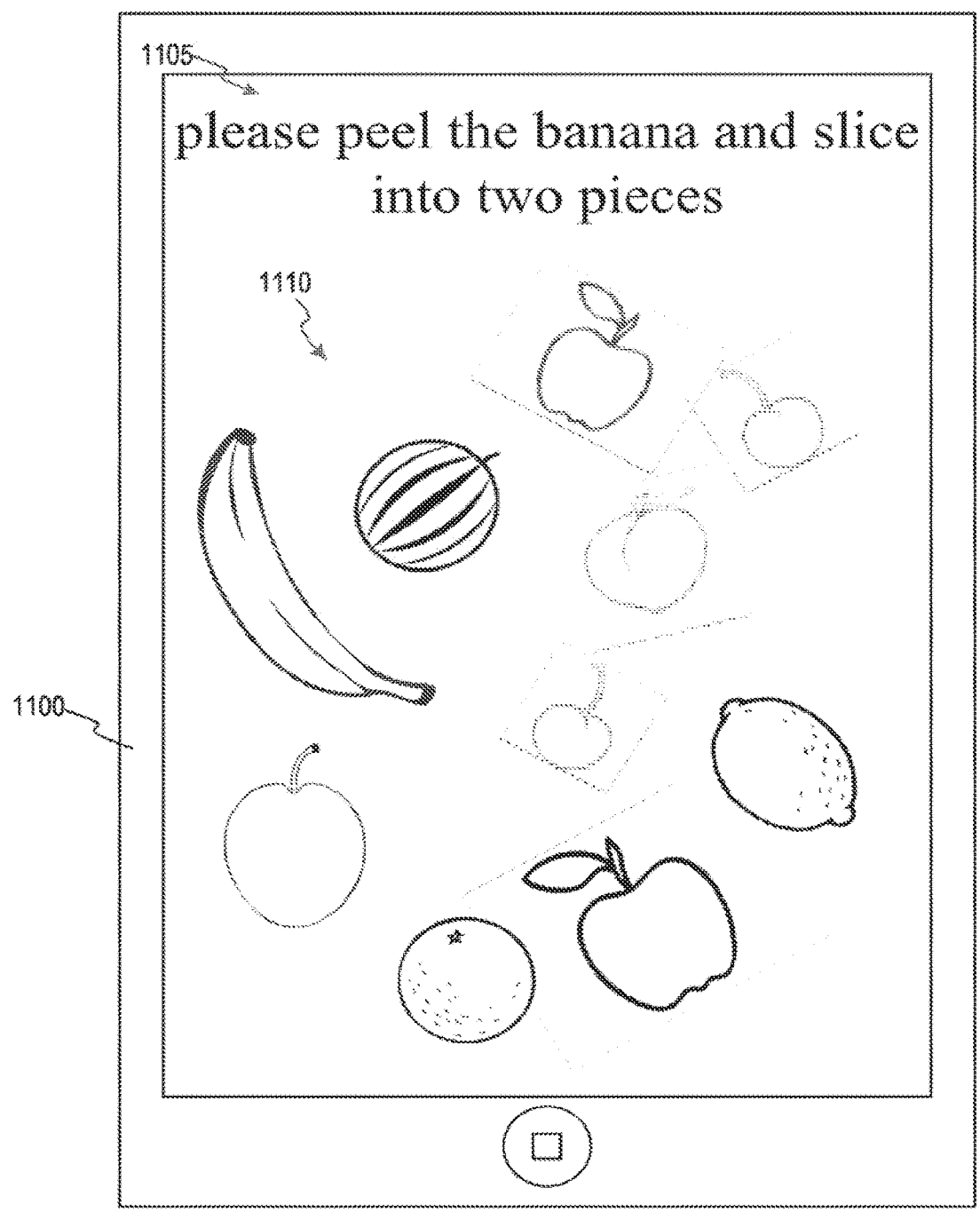
FIG. 11 depicts a fifth illustrative verification challenge according to an embodiment.

FIG. 11 depicts an illustrative user interface, generally designated 1100, according to an embodiment. The user interface 1100 may generally provide a command area 1105 containing instructions for the user to follow and/or a response area 1110 for receiving inputs from the user in response to the instructions provided in the command area. In some embodiments, the command area 1105 may be provided at substantially the same time as the response area 1110. In other embodiments, the command area 1105 may be provided prior to the response area 1110. In some embodiments, the command area 1105 may randomly change each time the user attempts to access the user interface 1100. Accordingly, the user may be required to remember the instructions in the command area 1105 each time before providing a response, thereby providing an additional layer of protection against unauthorized users. As shown in FIG. 11, the response area 1110 may contain a plurality of objects, such as, for example, fruit. Thus, the objects in the response area 1110 may vary in size and/or shape. Each object may be in a fixed location or may move around the user interface. In some embodiments, the location of each object may be random. In such a response area 1110, the user may generally be required to complete a task in response to the command, such as, for example, peel and/or slice a particular piece of fruit. Thus, the user may be required to recognize which piece of fruit is to be manipulated, and must provide particular inputs that mimic the tasks requested in the command area 1105. In particular embodiments where the object is moving, the user may provide an input in varying locations depending on the location of the object he/she is requested to manipulate. Such embodiments may discourage bots, which may not be able to determine the difference between objects, track the movement of each object, select the appropriate object, and/or provide the necessary motions corresponding to the required task.

Figure 12:
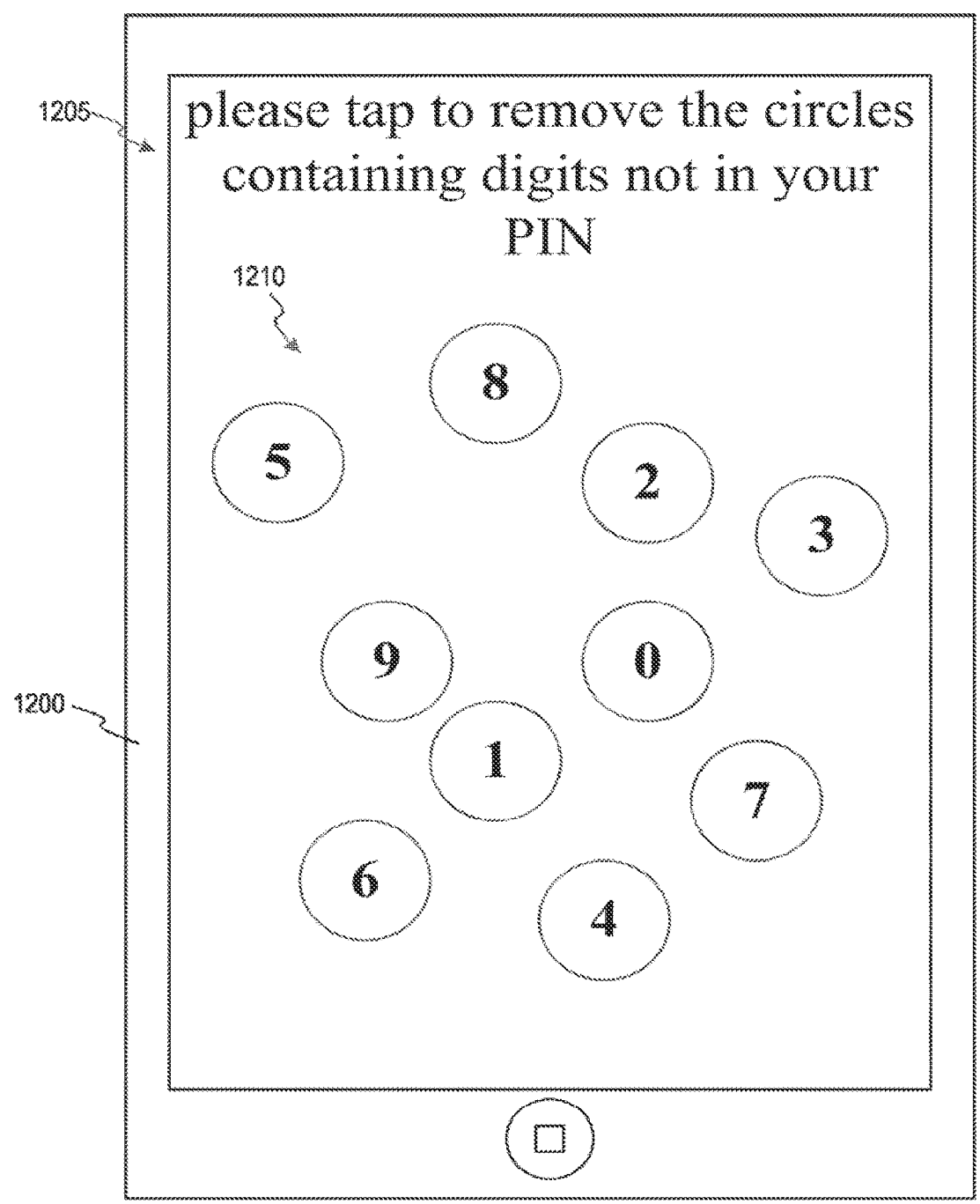
FIG. 12 depicts a sixth illustrative verification challenge according to an embodiment.

FIG. 12 depicts an illustrative user interface, generally designated 1200, according to an embodiment. The user interface 1200 may generally provide a command area 1205 containing instructions for the user to follow and/or a response area 1210 for receiving inputs from the user in response to the instructions provided in the command area. In some embodiments, the command area 1205 may be provided at substantially the same time as the response area 1210. In other embodiments, the command area 1205 may be provided prior to the response area 1210. Accordingly, the user may be required to remember the instructions in the command area 1205 before providing a response, thereby providing an additional layer of protection against unauthorized users. As shown in FIG. 12, the response area 1210 may contain a plurality of objects. Each object may be in a fixed location or may move around the user interface. In some embodiments, the location of each object may be random. Each object may contain, for example, a character such as a number, a letter, a symbol, and/or the like. In such a response area 1210, the user may generally be required to complete a task to "input" one or more characters. In some embodiments, the user may enter a specific sequence of characters such as a PIN number by tapping and/or clicking on any object that does not correspond to the specific sequence to remove the characters. In particular embodiments where the object is moving, the user may tap and/or click in varying locations depending on the location of the object containing the character he/she wishes to remove. Such embodiments may discourage bots, which may not be able to track the movement of each object and/or select an appropriate sequence of characters.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera As a non-limiting example, each range discussed herein can be readily broken down into a lower third, middle third and upper third, et cetera As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A system comprising:
   a processor; and
   a non-transitory, processor-readable storage medium, wherein the non-transitory, processor-readable storage medium comprises one or more programming instructions that, when executed, cause the processor to:
      receive data associated with a request to access a secured resource;

provide one or more verification challenges to one or more users via a user interface, wherein each verification challenge comprises a game from a set of one or more games;

receive input from at least one of the one or more users in response to at least one verification challenge, the received input comprising at least one gameplay input;

compare the received input against known information, wherein at least a portion of the known information comprises at least one of: information associated with the one or more users or gameplay associated with the one or more games; and determine, based on the comparison, at least one of:
that the received input corresponds to at least one parameter indicative of an authorized user;
that the received input does not correspond to at least one parameter indicative of an authorized user;
that the received input corresponds to at least one parameter indicative of an unauthorized user; and
that the received input does not correspond to at least one parameter indicative of an unauthorized user.

2. The system of claim 1, wherein the received input further comprises at least one additional input.

3. The system of claim 1, wherein the at least one of the one or more users comprises a plurality of users.

4. The system of claim 1, wherein the received input further comprises information, related to another user, that is known to the at least one of the one or more users.

5. The system of claim 1, further comprising one or more programming instructions that, when executed, cause the processor to grant the at least one of the one or more users access to the secured resource.

6. The system of claim 1, wherein the one or more programming instructions that, when executed, cause the processor to determine further comprises one or more programming instructions that, when executed, cause the processor to determine that the at least one of the one or more users is sufficiently cognitively aware.

7. The system of claim 1, further comprising one or more programming instructions that, when executed, cause the processor to identify one or more physiological features of the at least one of the one or more users based on the received input.

8. The system of claim 1, wherein at least one of the one or more verification challenges further comprises one or more characteristics attuned to one or more physiological features of the at least one of the one or more users.

9. The system of claim 8, wherein the received input comprises at least one variable corresponding to the one or more characteristics.

10. The system of claim 1, wherein at least one of the one or more verification challenges further comprises one or more temporal characteristics.

11. The system of claim 1, further comprising one or more programming instructions that, when executed, cause the processor to identify one or more features of the received input indicating that the at least one of the one or more users is under duress.

12. The system of claim 1, further comprising one or more sensors operatively connected to the processor, wherein the received input further comprises one or more sensor inputs.

13. The system of claim 12, wherein the one or more programming instructions that, when executed, cause the processor to compare the received input against known information further comprise one or more programming instructions that, when executed, cause the processor to compare the one or more sensor inputs against the known information.

14. The system of claim 12, wherein the one or more sensors are positional sensors.

15. The system of claim 1, wherein the one or more programming instructions that, when executed, cause the processor to compare the received input against known information further comprise one or more programming instructions that, when executed, cause the processor to apply, to the received input, a pre-existing rule, the pre-existing rule being known to the system and the user interface.

16. The system of claim 1, further comprising one or more programming instructions that, when executed, cause the processor to provide, responsive to determining that the received input does correspond to at least one parameter indicative of an unauthorized user, the at least one of the one or more users with at least one additional verification challenge.

17. The system of claim 1, further comprising one or more programming instructions that, when executed, cause the processor to provide, responsive to determining that the received input does not correspond to at least one parameter indicative of an authorized user, the at least one of the one or more users with at least one additional verification challenge.

18. The system of claim 1, wherein the game comprises at least one of a floating balloon game, a maze game, a cutting game, a puzzle game, and a memory game.

19. The system of claim 1, wherein the game is randomly selected from a plurality of games or game formats.

20. The system of claim 1, wherein the at least one parameter comprises at least one of a passcode, a completion of an assigned task, an amount of time that has elapsed between providing the at least one verification challenge and receiving at least a portion of the received input, a known physical trait of an authorized user, and a location of an electronic device.

21. The system of claim 20, wherein the at least one parameter comprises the amount of time that has elapsed between providing the at least one verification challenge and receiving at least a portion of the received input, and wherein the amount of time is greater than a minimum amount of time and less than a maximum amount of time.

22. The system of claim 20, wherein the at least one parameter comprises the amount of time that has elapsed between providing the at least one verification challenge and receiving at least a portion of the received input, and wherein the amount of time is less than a minimum amount of time or greater than a maximum amount of time.

23. The system of claim 1, further comprising one or more programming instructions that, when executed, cause the processor to:
responsive to determining that the received input does not correspond to at least one parameter indicative of an authorized user at least one of:
provide a notification of denied access to the at least one of the one or more users;
provide a notification of denied access to an administrator; and
direct a storage device to record identifying information of the at least one of the one or more users.

24. The system of claim 1, further comprising one or more programming instructions that, when executed, cause the processor to:

responsive to determining that the received input does correspond to at least one parameter indicative of an unauthorized user at least one of:
provide a notification of denied access to the at least one of the one or more users;
provide a notification of denied access to an administrator; and
direct a storage device to record identifying information of the at least one of the one or more users.

25. The system of claim 1, further comprising one or more programming instructions that, when executed, cause the processor to direct a storage device to record identifying information of the at least one of the one or more users.

26. A method comprising:
receiving, by a processor, data associated with a request to access a secured resource;
providing, by the processor, one or more verification challenges to one or more users via a user interface, wherein each verification challenge comprises a game from a set of one or more games;
receiving, by the processor, input from at least one of the one or more users in response to at least one verification challenge of the one or more verification challenges, the received input comprising at least one gameplay input;
comparing, by the processor, the received input against known information, wherein at least a portion of the known information comprises at least one of: information associated with the one or more users or gameplay associated with the one or more games; and
determining, based on the comparison, at least one of:
that the received input corresponds to at least one parameter indicative of an authorized user;
that the received input does not correspond to at least one parameter indicative of an authorized user;
that the received input corresponds to at least one parameter indicative of an unauthorized user; and
that the received input does not correspond to at least one parameter indicative of an unauthorized user.

27. The method of claim 26, wherein the received input further comprises at least one additional input.

28. The method of claim 26, wherein the at least one of the one or more users comprises a plurality of users.

29. The method of claim 26, wherein the received input further comprises information, related to another user, that is known to the at least one of the one or more users.

30. The method of claim 26, further comprising granting, by the processor, the at least one of the one or more users access to the secured resource.

31. The method of claim 26, wherein the determining further comprises, determining that the at least one of the one or more users is sufficiently cognitively aware.

32. The method of claim 26, further comprising identifying, by the processor, one or more physiological features of the at least one of the one or more users based on the received input.

33. The method of claim 26, wherein at least one of the one or more verification challenges further comprises one or more characteristics attuned to one or more physiological features of the at least one of the one or more users.

34. The method of claim 33, wherein the received input comprises at least one variable corresponding to the one or more characteristics.

35. The method of claim 26, wherein at least one of the one or more verification challenges further comprises one or more temporal characteristics.

36. The method of claim 26, further comprising identifying, by the processor, one or more features of the received input indicating that the at least one of the one or more users is under duress.

37. The method of claim 26, wherein the received input further comprises one or more sensor inputs from one or more sensors.

38. The method of claim 37, wherein comparing the received input against known information further comprises comparing the one or more sensor inputs against the known information.

39. The method of claim 37, wherein the one or more sensors are positional sensors.

40. The method of claim 26, wherein comparing the received input against known information further comprises: applying, by the processor, to the received input, a pre-existing rule, the pre-existing rule being known to the processor and the user interface.

41. The method of claim 26, responsive to determining that the received input corresponds to at least one parameter indicative of an unauthorized user further comprises providing, by the processor, the at least one of the one or more users with at least one additional verification challenge.

42. The method of claim 26, responsive to determining that the received input does not correspond to at least one parameter indicative of an authorized user further comprises providing, by the processor, the at least one of the one or more users with at least one additional verification challenge.

43. The method of claim 26, wherein the game comprises at least one of a floating balloon game, a maze game, a cutting game, a puzzle game, and a memory game.

44. The method of claim 26, wherein the game is randomly selected from a plurality of games or game formats.

45. The method of claim 26, wherein the at least one parameter comprises at least one of a passcode, a completion of an assigned task, an amount of time that has elapsed between providing the at least one verification challenge and receiving at least a portion of the received input, a known physical trait of an authorized user, and a location of an electronic device.

46. The method of claim 45, wherein the at least one parameter comprises the amount of time that has elapsed between providing the at least one verification challenge and receiving at least a portion of the received input, and wherein the amount of time is greater than a minimum amount of time and less than a maximum amount of time.

47. The method of claim 45, wherein the at least one parameter comprises the amount of time that has elapsed between providing the at least one verification challenge and receiving at least a portion of the received input, and wherein the amount of time is less than a minimum amount of time or greater than a maximum amount of time.

48. The method of claim 26, further comprising:
responsive to determining that the received input does not correspond to at least one parameter indicative of an authorized user at least one of:
providing, by the processor, a notification of denied access to the at least one of the one or more users;
providing, by the processor, a notification of denied access to an administrator; and
directing, by the processor, a storage device to record identifying information of the at least one of the one or more users.

49. The method of claim 26, further comprising:
responsive to determining that the received input does correspond to at least one parameter indicative of an unauthorized user at least one of:
providing, by the processor, a notification of denied access to the at least one of the one or more users;
providing, by the processor, a notification of denied access to an administrator; and
directing, by the processor, a storage device to record identifying information of the at least one of the one or more users.

50. The method of claim 26, further comprising directing, by the processor, a storage device to record identifying information of the at least one of the one or more users.

51. The system of claim 1, wherein at least a portion of the received input is used for at least one of the following: mining data, retrieving information, organizing data, sorting data, indexing data, gathering analytics, solving known problems, solving scientific problems, customizing advertising content, and operating a recommendations system.

52. The system of claim 1, wherein the known information comprises one or more learned user characteristics associated with at least one known user, and wherein the received input is further compared against at least one of the one or more learned user characteristics.

53. The system of claim 52, wherein at least one of the one or more learned user characteristics are based on at least one of: behavior tendencies of the at least one known user, cognitive tendencies of the at least one known user, gameplay of the at least one known user, and data specific to the at least one known user.

54. The system of claim 52, wherein each of the one or more learned user characteristics are associated with at least one of an authorized user or an unauthorized user.

55. The system of claim 52, wherein the one or more programming instructions further comprise one or more programming instructions that, when executed, cause the processor to identify one or more known users.

56. The system of claim 1, further comprising one or more programming instructions that, when executed, cause the processor to direct a storage device to modify the known information based on the received input.

57. The system of claim 56, wherein the one or more programming instructions that, when executed, cause the processor to provide the one or more verification challenges further comprise one or more programming instructions that, when executed, cause the processor to adapt the one or more verification challenges based on the modified known information.

58. The system of claim 56, wherein the one or more programming instructions further comprise using the modified known information to generate one or more additional requests to access at least one of: the secured resource or at least one additional secured resource.

59. The system of claim 1, wherein the one or more programming instructions that, when executed, cause the processor to provide the one or more verification challenges further comprises one or more programming instructions that, when executed, cause the processor to modify the one or more verification challenges in real time based on at least one of the known information or the received input.

60. The system of claim 1, wherein the one or more programming instructions that, when executed, cause the processor to provide the one or more verification challenges further comprises one or more programming instructions that, when executed, cause the processor to select the one or more verification challenges from a plurality of verification challenges based on at least one of the known information or the data associated with a request to access a secured resource.

61. The system of claim 1, wherein the known information comprises information selected from the group consisting of information associated with the at least one of the one or more users, and gameplay associated with one or more games.

62. The method of claim 26, wherein at least a portion of the received input is used for at least one of the following: mining data, retrieving information, organizing data, sorting data, indexing data, gathering analytics, solving known problems, solving scientific problems, customizing advertising content, and operating a recommendations system.

63. The method of claim 26, wherein the known information comprises one or more learned user characteristics associated with at least one known user, and wherein the received input is further compared against at least one of the one or more learned user characteristics.

64. The method of claim 63, wherein at least one of the one or more learned user characteristics are based on at least one of: behavior tendencies of the at least one known user, cognitive tendencies of the at least one known user, gameplay of the at least one known user, and data specific to the at least one known user.

65. The method of claim 63, wherein each of the one or more learned user characteristics are associated with at least one of an authorized user or an unauthorized user.

66. The method of claim 63, wherein the determining further comprises identifying, by the processor, one or more known users.

67. The method of claim 26, further comprising modifying, by the processor, the known information based on the received input.

68. The method of claim 67, wherein providing, by the processor, one or more verification challenges, further comprises adapting, by the processor, one or more verification challenges based on the modified known information.

69. The method of claim 67, wherein the modified known information is used to generate one or more additional requests to access at least one of: the secured resource or at least one additional secured resource.

70. The method of claim 26, wherein providing the one or more verification challenges further comprises selecting, by the processor, the one or more verification challenges from a plurality of verification challenges, wherein the selection is based on at least one of the known information or the data associated with a request to access a secured resource.

71. The method of claim 26, wherein providing the one or more verification challenges further comprises modifying, by the processor, the one or more verification challenges in real time based on at least one of the known information or the received input.

72. The method of claim 26, wherein the known information comprises information selected from the group consisting of: information associated with the at least one of the one or more users, and gameplay associated with one or more games.

* * * * *